Sept. 9, 1969 R. W. DONOHOE 3,465,562
ELECTRO-PNEUMATIC POROSITY TEST METHOD AND MEANS
Filed Oct. 31, 1967 3 Sheets-Sheet 2

INVENTOR.
ROBERT W. DONOHOE
BY
*Everett G. Wright*
ATTORNEY

United States Patent Office 3,465,562
Patented Sept. 9, 1969

3,465,562
ELECTRO-PNEUMATIC POROSITY TEST METHOD
AND MEANS
Robert W. Donohoe, 6561 Clarkston Road, Independence
Township, Oakland County, Mich. 48016
Filed Oct. 31, 1967, Ser. No. 679,474
Int. Cl. G01m 3/04
U.S. Cl. 73—40          6 Claims

ABSTRACT OF THE DISCLOSURE

The specification discloses an improved electro-pneumatic porosity test method and means for dry leak testing of cavitied parts at extremely high production rates employing a source of compressed air, a timer controlled Fill Cycle including means applying compressed air under a pressure somewhat greater than a selected test pressure to a test part and to a pneumatic system including a differential pressure gage transducer, a timer controlled Stabilization Cycle including means stabilizing said compressed air in said pneumatic system at a selected test pressure and starting a timer controlled Test Cycle means wherein loss of pressure in said test part actuates the differential pressure gage transduced sensing an unbalance in the pneumatic system responsive to any leakage of part being tested whereby said unbalance in said differential pressure gage transducer indicates mechanically the extent of the unbalance and creates an electrical impulse responsive and proportionate to said unbalance in said pneumatic system, means amplifying said electrical impulse to indicate by a visual signal or otherwise the rejection of a part being leak tested having a leakage greater than a selected leak rate tolerance, zero drift compensating means connected between the said differential pressure gage transduced and said amplifying means operable prior to the initiation of each leak test cycle establishing an electrical zero or null condition in said amplifying means, and a calibrating means including a manually operated valve controlled flow meter in the pneumatic system and a variable attenuation control employed in conjunction with the amplifying means.

This invention relates to improved electro-pneumatic dry leak porosity test method and means for leak testing castings, weldments, and other parts having a cavity therein which is capable of accurately and consistently detecting extremely low leakage rates of air or other test gases from such items as cylinder heads, manifolds, pump bodies, housings and the like, the said dry leak porosity test method and means preferably utilizing compressed air as a test medium and employs electrically generated and electronically amplified leak rate signals to indicate acceptance or rejection of the part being tested.

The primary object of the invention is to provide an improved dry leak test method and means for testing cavities of castings and other parts for leakage therefrom which is capable of detecting extremely low leakage rates of air at a minimum test time per piece tested; for example, as low as 8 to 12 seconds per test, thus accomplishing relatively low test intervals to meet requirements of high production schedules for parts being leak tested.

A further object of the invention is to provide, in an electro-pneumatic porosity test method and means for dry leak testing of cavitied castings and the like, calibrated indicating and signaling means which accurately indicate the amount of air leakage from the test part, such leak indicating and signaling means being easily and readily adjusted for testing of test parts of different volumes using different test air pressures, and for signaling different amounts of leakage from such test parts.

Another object of the invention is to provide an electro-pneumatic porosity test method and means employing a Pneumatic System, an Electrical Sysetem, and an Electronic System inter-related in operation to perform accurately and rapidly a Complete Test Cycle including a Fill Cycle to fill the cavity of a part to be tested with a proper amount of air or other suitable gases under a pressure somewhat higher than a selected test pressure, to perform a Stabilization Cycle in a minimum of time to stabilize or balance the air in the Pneumatic System at the selected test pressure, to perform a Test Cycle to sense unbalance occurring in the Pneumatic System responsive to leakage of a part being tested, to generate electrical impulses responsive to said unbalance in the Pneumatic System caused by test part leakage, and then amplify said impulse whereby to indicate by visual signal and/or otherwise the rejection of a part being leak tested having leakage therein greater than at a selected leak rate tolerance, or, if no leakage in the part occurs up to or equal to the said selected leak rate tolerance, to indicate by visual signal and/or otherwise acceptance of the part being leak tested upon completion of the leak test.

A further object of the invention is to provide in a dry leak tester of the invention means in the Electronic System thereof for establishing a Zero-null condition of the test indicating and signaling apparatus at the start of each Test Cycle to compensate for any possible drift that may have occurred in the Pneumatic and Electrical Systems during the previous Complete Test Cycle or during the Fill and Stabilization Cycle of the following Complete Test Cycle.

A further object of the invention is to provide in an electro-pneumatic porosity test method and means a large hole leak indicating means operable responsive to large hole leaks either in a part being tested or in the means employed to hermetically seal the part for testing, which large hole leak indicating means functions to terminate any leak test immediately upon detecting any such large hole leakage condition.

Still another object of the invention is to provide, in the Electrical and Electronic Systems of an electro-pneumatic porosity test method and means, control relay and visual signal means to indicate proper progress and the results of each Complete Test Cycle thereof.

Other objects of the invention will become apparent by reference to the following detailed description taken in connection with the accompanying drawings, in which.

Figure 1:
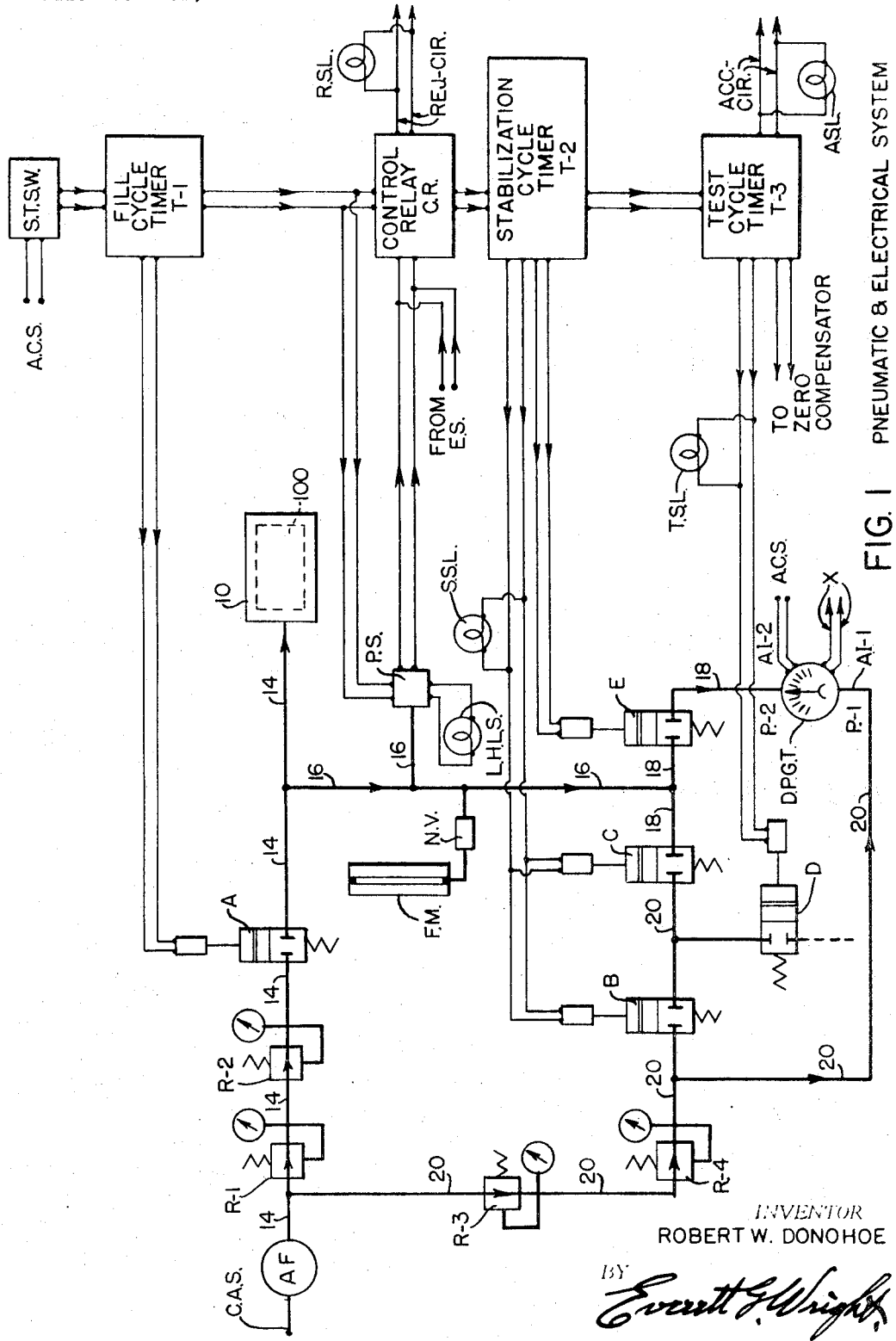
FIG. 1 is a diagrammatic view of the Pneumatic System and Electrical System preferably employed of a dry leak tester of the invention in a pre-test condition, all solenoid valves being normally spring loaded closed with the solenoids thereof deenergized.
Figure 2:
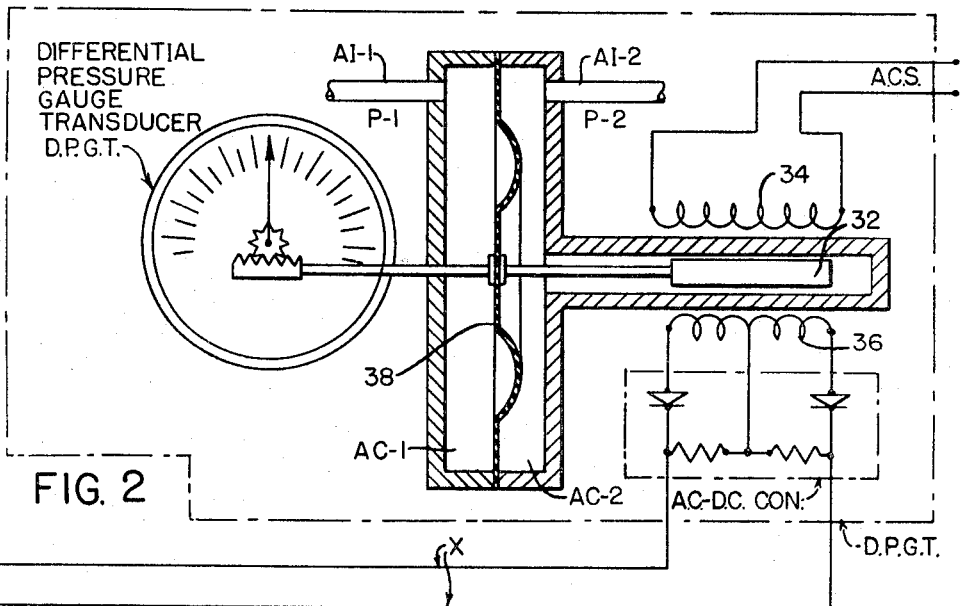
FIG. 2 is a more or less diagrammatic view of the Differential Pressure Gage Transducer of the Pneumatic System shown in its neutral position with the air pressures P-1 and P-2 on each side of the diaphragm thereof equal or balanced by the Stabilization Cycle before the Test Cycle is initiated.

Referring now to the drawings wherein like and corresponding reference characters refer to like and corresponding parts throughout the several views, the particular illustrative embodiment of an electro-pneumatic porosity test method and means of the invention for air leak testing of cavitied parts consists of three inter-related systems comprising a Pneumatic System, an Electrical System and an Electronic System, all functioning to accomplish three sequential cycles; namely, a Fill Cycle, a Stabilization Cycle, and a Test Cycle, all of which cooperate to perform a Complete Test Cycle for fast and accurate leak testing of a cavitied Test Part 10.

The Pneumatic System performs sequentially under control of the Electrical System, a Fill Cycle to fill the cavity 100 of a Test Part 10 with compressed air, or other gases, at a selected fill pressure which is somewhat higher than the selected test pressure, a Stabilization Cycle which stabilizes or balances the air pressure in that portion of the Pneumatic System which includes the Test Part 10 at the selected test pressure, and a Test Cycle during which small electrical impulses or leak test signals are initiated in the Electronic System responsive to and in proportion to an unbalance of test pressure in the Differential Pressure Gage Transducer DPGT of the Pneumatic System caused by leakage in the Test Part 10 being tested. These leak test signals are amplified in the Electronic System, and the same amplified leak test signals are read visually on a Differential Voltage Leak Indicator DVLI which is calibrated to indicate the amount of leakage from the Test Part 10 being leak tested. The amplified leak test signals are also employed to actuate an electronic switch ES or switches in the Electronic System to indicate the rejection of a Test Part 10 having a leak test rate greater than a selected acceptable leak test rate, and to terminate the Test Cycle, thus completing a Complete Test Cycle.

Prior to the beginning of each Complete Test Cycle of the electro-pneumatic porosity dry leak test means of the invention, a cavitied Test Part 10 to be tested is first suitably clamped by such means as a Hydraulic Cylinder 120 in hermetically sealed relationship in a Test Fixture 12 to which the Pneumatic System is connected by a fill pressure line 14.

A Start Test Switch STSW of the Electrical System is closed either manually or responsive to the said clamping of the Test Part 10 in the Test Fixture 12 to furnish alternating current from a suitable source ACS to the Fill Cycle Timer T-1 to start a Complete Test Cycle.

At the beginning of each Complete Test Cycle, all Solenoid Valves A, B, C, D and E of the Pneumatic System are in their normal spring loaded closed position, and compressed air from a suitable Compressed Air Source CAS is supplied through an Air Filter AF to the Pneumatic System through the fill pressure line 14.

Referring now particularly to a preferred Pneumatic and Electrical System as shown in FIG. 1, compressed air from the Compressed Air Source CAS and the Air Filter AF is supplied through the fill pressure line 14 to fill the cavitied Test Part 10, the said compressed air passing through a Primary Pressure Stabilizing Regulator R-1, through a precision Fill Pressure Regulator R-2 which is set at an air pressure somewhat greater than the selected test pressure, and through the normally closed Solenoid Fill Valve A which is opened under control of a Fill Cycle Timer T-1 for an adequate length of time to fill the Test Part 10. While the Solenoid Fill Valve A is open, compressed air under said greater than selected test pressure is also supplied from the fill pressure line 14 through a pressure line 16 to a pressure line 18 between the closed Solenoid Valves C and E, to a Pressure Switch PS, and is made available to a Flow Meter FM through a normally closed manually operated Needle Valve NV.

The said Pressure Switch PS functions at a minimum allowable air pressure in the Pneumatic System to permit continuation of the Complete Test Cycle upon completion of the Fill Cycle. If there is not a minimum allowable air pressure in the Test Part 10 upon completion of the Fill Cycle, then the Pressure Switch PS functions to indicate through the Electrical System that a malfunction exists consisting of either a large air leak in the Pneumatic System or in the Test Part 10 or in the hermetic clamping of the said Test Part 10 in the Test Fixture 12, or that a lack of sufficient air pressure to permit the Pneumatic System to function properly is being delivered from the Compressed Air Source CAS to the Pneumatic System.

The functioning of said Pressure Switch PS energizes the Control Relay CR to terminate the Complete Test Cycle at the end of the Fill Cycle and lights a Large Hole Leak Signal LHLS in the Electrical System, and places the entire electro-pneumatic porosity leak test means in a test completed state.

Compressed air is only admitted to the Flow Meter FM through the manually operated Needle Valve NV to simulate an allowable leak rate during calibration of the entire electro-pneumatic porosity leak test means.

During the Complete Test Cycle, compressed air from the Compressed Air Source CAS is also supplied through the pressure line 20, and through a Primary Pressure Regulator R-3 and a Precision Test Pressure Regulator R-4 set at a selected test pressure P-1 to the Air Inlet AI-1 of a Differential Pressure Gage Transducer DPGT and to the normally closed Solenoid Valve B which is opened only during the Stabilization Cycle described below.

As soon as the cavity 100 of the Test Part 10 is filled with compressed air under pressure greater than the selected test pressure, the Fill Cycle Timer T-1 deenergizes the solenoid of the Solenoid Fill Valve A which closes and completes the Fill Cycle.

When the Fill Cycle Timer T-1 times out at the end of the Fill Cycle, it causes the Stabilization Cycle Timer T-2 to start the Stabilization Cycle. Stabilization Cycle Timer T-2 opens Solenoid Valves B, C and E simultaneously whereupon air pressure in the Pneumatic System becomes stabilized by the exhausting of air under the hereinabove referred to excess fill pressure from the Test Part 10 to atmosphere through the exhaust port of the Precision Test Regulator R-4 so that the pressure P-2 to the Air Inlet AI-2 of the Differential Pressure Gage Transducer DPGT and the part test pressure equals the selected test pressure P-1 at the Air Inlet AI-1 of said Differential Pressure Gage Transducer DPGT. As soon as the air pressure in the Pneumatic System is completely stabilized as aforesaid, the Stabilization Cycle Timer T-2 deenergizes Solenoid Valves B and C permitting them to close. During the time the Solenoid Valves B and C are open, the Stabilization Signal Light SSL is lighted indicating that the Stabilization Cycle is in progress. The said Stabilization Cycle Timer T-2 then starts the Test Cycle Timer T-3 whereupon the Stabilization Cycle Timer T-2 times out. The Test Cycle Timer T-3 opens Solenoid Valve D to relieve back pressure in the Solenoid Valves B and C which assures that the said Solenoid Valves B and C are pressure sealed after their spring closing.

The Pneumatic System is now in condition for the performance of the Test Cycle under control of the Test Cycle Timer T-3 while the Stabilization Cycle Timer T-2 maintains the Solenoid Valve E open until the Test Cycle is completed. The air pressures P-1 and P-2 on opposite sides of the Diaphragm 38 of the Differential Pressure Gage Transducer DPGT having been balanced at the selected test pressure and are equal, any change in air pressure P-2 caused by a leak in the Test Part 10 being tested is indicated by the Differential Pressure Gage Transducer DPGT.

During the Fill and Stabilizing Cycles, the Coil 30 of Time Delay Relay TDR of the Zero Compensator ZC is deenergized and the contacts of the spring loaded closed Time Delay Relay TDR are closed.

Any voltage that occurs across the output of the AC to DC Converter AC–DC CON caused by imperfect alignment of the Core 32 of the Differential Pressure Gage Transducer DPGT with respect to the Differential Pressure Gage Transducer DPGT Primary and Secondary Windings 34 and 36 or Displacement of the Core 32 of the said Differential Pressure Gage Transducer DPGT by slight residual unbalance of Air Pressures P–1 and P–2 in Air Chambers AC–1 and AC–2 on opposite sides of the Diaphragm 38 of the Differential Pressure Gage Transducer DPGT after Valve B closes is stored in the Capacitor CAP of the Zero Compensator ZC. At this time the voltage of Circuit Y to the high Impedance Input Amplifier HIIA is Zero.

Figure 3:
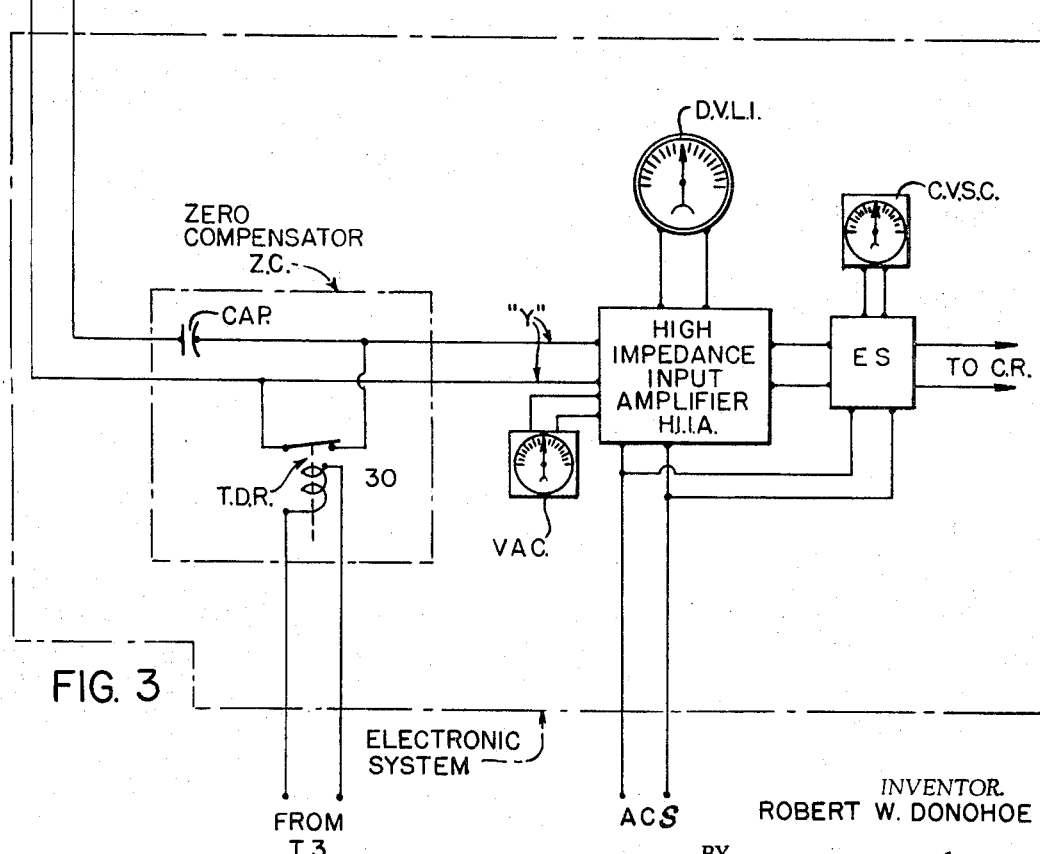
FIG. 3 is a diagrammatic view of the Electronic System preferably employed operable responsive to the Differential Pressure Gage Transducer of the Pneumatic System.
Figure 4:
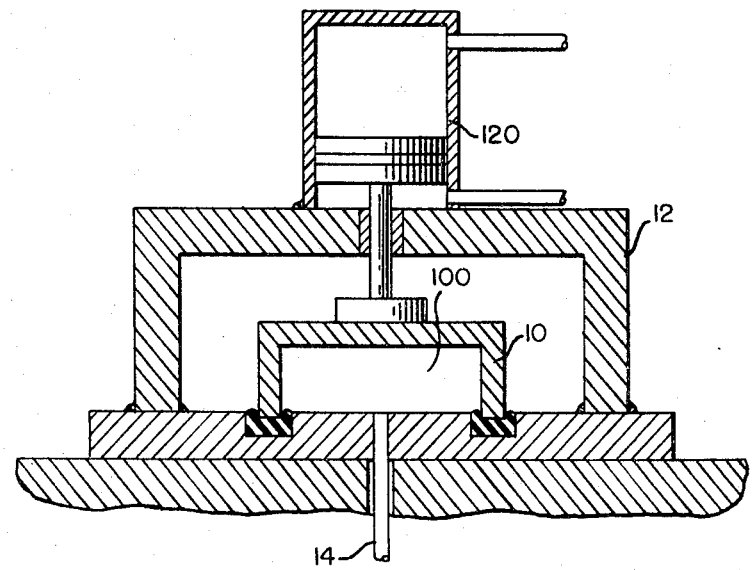
FIG. 4 is a more or less diagrammatic view showing a test part hermetically clamped in a test fixture with a test pressure fill line leading to the test part cavity.

When the Test Cycle is initiated by the starting of the Test Timer T–3, the Coil 30 of the Time Delay Relay TDR of the Zero Compensator ZC is energized, and, after a short time delay, during which the Pneumatic System becomes fully stabilized, the normally closed contact of the Time Delay Relay TDR will open from its closed position shown in FIG. 3 whereby to place the Electronic System in Test condition.

When the Time Delay Relay TDR contacts open, then, any additional voltage impressed on Circuit X to the Zero Compensator ZC by movement of the DPGT Core 32 responsive to any further unbalance of pressures on the Diaphragm 38 of the Differential Pressure Gage Transducer DPGT will be impressed on the input of the High Impedance Input Amplifier HIIA through the Capacitor CAP of the Zero Compensator and the Circuit Y. The amplified voltage causes the Differential Voltage Leak Indicator DVLI to indicate the degree and direction of movement of the Diaphragm 38 of the Differential Pressure Gage Transducer PDGT, thereby indicating by suitable calibrations on the dial of the Differential Voltmeter Leak Indicator DVLI the amount of leakage of air from the Test Part 10. After the Test Timer T–3 times out, the Time Delay Relay TDR of the Zero Compensator ZC closes, and the voltage in Circuit X becomes Zero to end the Test Cycle.

During the test time as controlled by the Test Timer T–3, the aforesaid amplified voltage from the High Impedance Input Amplifier HIIA also is impressed on the input of an Electronic Switch ES having a Calibrated Variable Sensitivity Control CVSC which is calibrated corresponding to the movement of the Diaphragm 38 of the Differential Pressure Gage Transducer DPGT, and, in the event the Test Part 10 leaks, the said Electronic Switch ES will close at a predetermined leak rate set by the said Calibrated Variable Sensitivity Control CVSC. The said Electronic Switch ES is preferably connected to a Reject Signal Light RSL indicating the Rejection of a Test Part 10 for excess leakage, or, the said Electronic Switch ES may be connected to a suitable Reject Circuit REJ–CIR through the Control Relay CR to operate any desired automatic equipment that may be associated with the Electro-Pneumatic Porosity Leak Test Method and Means, or may be connected to any desired combination of signal lights and control relays.

It should be noted that the Differential Voltmeter Leak Indicator DVLI is provided in the Electronic System of the Electro-Pneumatic Porosity Test Method and Means for the purpose of indicating to the operator thereof that it is functioning normally.

The High Impedance Input Amplifier HIIA is provided with a Variable Attenuation Control VAC for the purpose of calibrating the output voltage of the High Impedance Input Amplifier HIIA with respect to the voltage in Circuit X as required for testing cavited test parts of different volumes under different air test pressures for accurate indication of leakage from the Test Part 10 as indicated on the Differential Voltmeter Leak Indicator DVLI and on the accurate calibrations of the Electronic Switch ES.

The High Impedance Input Amplifier HIIA may be omitted if a high resistance current meter leak indicator is employed instead of the Differential Voltmeter Leak Indicator DVLI. However, the use of a current meter of sufficiently high resistance to permit the Zero Compensator ZC to function by storage of voltage in the Capacitor CAP thereof for relatively long test periods is not practical because of the fact that such a current meter would be so sensitive and physically delicate as to be unstable in most industrial environments. Furthermore, the use of a high resistance current meter would also require the use of an electronic switch or similar device with a high impedance input and additional amplification, which would be economically undesirable.

It is obvious that more than one Electronic Switch ES may be used to classify test parts according to quality, or when the Electro-Pneumatic Porosity Test Method and Means is used on multi-cavited test parts having adjacent cavities to select test parts according to leak from any cavity to atmosphere or from one cavity of the multi-cavitied test part into another adjacent cavity thereof with different test pressures employed in each of said adjacent cavities.

During the Test Cycle as controlled by the Test Timer T–3, if the leak rate of a Test Part 10 is less than the acceptable leak rate as set by the Calibrated Variable Sensitivity Control CVSC of the Electronic System, the said Test Part will not be rejected, and when Test Timer T–3 times out, it will cause the ACCEPT Signal Light ASL to illuminate and the TEST Signal Light TSL to become extinguished, the said TEST Signal Light TSL having been illuminated by the Timer T–3 at the start of the Test Cycle. The Leak Test Cycle will remain in this condition until the Start Test Switch STSW is opened, at which time Timers T–1, T–2 and T–3 will automatically reset themselves and the ACCEPT Signal Light ASL will become extinguished. Obviously, when the ACCEPT Signal Light is illuminated when the Test Timer T–3 times out after a Test Part 10 has not been rejected, the said Test Timer T–3 may supply current through a suitable Accept Circuit ACC–CIR to operate any desired automatic equipment.

During the Test Cycle as controlled by the Test Timer T–3, if the leak rate of a Test Part 10 is greater than the acceptable leak rate as set by the Calibrated Variable Sensitivity Control CVSC of the Electronic System, the said Test Part 10 will be rejected as the result of the Core 32 of the Differential Pressure Gage Transducer DPGT having moved a sufficient distance to cause the Electronic Switch ES of the Electronic System to close as hereinbefore described. The said Electronic Switch ES will energize the coil of the Control Relay CR of the Electrical System and cause the REJECT Signal Light RSL to illuminate and simultaneously stop the Stabilization Timer T–2 and the Test Timer T–3, and, the TEST Signal Light TSL having been illuminated by the Test Timer T–3 will become extinguished, Solenoid Valves D and E will close, Time Delay Relay TDR of the Electronic System will be deenergized and the contacts thereof will close whereby to reduce the voltage in Circuit Y to Zero. The output voltage of the High Impedance Input Amplifier HIIA of the Electronic System will then be reduced to Zero and the Electronic Switch ES will open. The electro-pneumatic porosity test method and means is now in a test terminated condition with the Control Relay CR of the Electrical System energized until the Start Test Switch STSW is opened, at which time the Fill Timer T–1 will reset, the Control Relay CR will become deenergized, and the REJECT Signal Light RSL will be extinguished.

The pressure gage of the Differential Pressure Gage Transducer DPGT is employed as a reference to indicate normal or abnormal functioning of the Pneumatic System, and also in locating possible malfunctions that may occur in the Electronic System.

One of the important features of the electro-pneumatic porosity test method and means of the invention is the simplicity and ease of calibration thereof.

Assuming that the indicating range of the Differential Voltmeter Leak Indicator DVLI of the Electronic System is greater than 0 to 10 cc. and that the dial scale of the Calibrated Variable Sensitivity Control CVSC of the Electronic Switch ES and the scale of the Flow Meter FM are graduated accordingly, the Test Timer T-3 is set at 60 seconds for calibration purposes only.

The Calibrated Variable Sensitivity Control CVSC is then set above 10 cc. to prevent occurrence of a test part reject, and a non-leaking Test Part 10 is clamped in the Test Fixture 12. The Start Test Switch STSW is now closed to start a Complete Test Cycle. The adjustable Needle Valve NV of the Flow Meter FM is opened sufficiently to obtain a flow of 10 cc. per minute of air from the Test Part 10 as indicated on the scale of the Flow Meter FM. During the Test Cycle under control of the Test Timer T-3, the Variable Attenuation Control VAC of the High Impedance Input Amplifier HIIA is now adjusted by manual manipulation to adjust the gain of the High Impedance Input Amplifier HIIA so that the dial of the Differential Voltmeter Leak Indicator DVLI indicates 10 cc. at the exact time that the Test Timer T-3 times out to complete the Test Cycle. (Some repetition of the foregoing procedure may be required to obtain maximum accuracy of adjustment.)

The High Impedance Input Amplifier HIIA is now calibrated so that, during succeeding Test Cycles, the dial of the Differential Voltmeter Leak Indicator DVLI will constantly indicate the amount of leakage in cc. of air from like Test Parts 10 during any test time period. (At the end of any 60 second test time period, the rate of leakage in cc. per minute will be indicated on the dial of the Differential Voltmeter Leak Indicator DVLI.)

Upon the completion of the calibration procedure as hereinbefore described, the Needle Valve NV is closed, and, for production testing of like Test Parts 10, the Calibrated Variable Sensitivity Control CVSC of the Electronic Switch ES is set at any desired Leakage Rejection Value within its range of adjustment, and the Test Timer T-3 is set to time-out at any practical Test Cycle Time, such as five seconds.

From the foregoing description, it is apparent that adjustment of the Variable Attenuation Control VAC can be made so that the Electronic System will indicate either the amount of leakage in cc. of a Test Part 10 regardless of the Test Time as determined by the selective setting of the Test Timer T-3, or, the rate of leakage in cc. per minute for any selected Test Time, both regardless of the volume of the Cavity 100 of the Test Part 10 or the selected test pressure and using only one flow rate through the Flow Meter FM for all required calibrations, all by simple manipulation of the time selection control of the Test Timer T-3, the Needle Valve NV, and the Variable Attenuation Control VAC of the High Impedance Input Amplifier HIIA.

After the initial calibration of the electronic system as above described, any desired change in the selection of an allowable maximum leak rate for automatic rejection of Test Parts 10 may be accomplished solely by selective adjustment of the Calibrated Variable Sensitivity Control CVSC in the said Electronic System.

Also, by using different calibration techniques, the Electronic System may be calibrated in units of pressure or pressure change.

One of the major advantages of the electro-pneumatic porosity test method and means of the invention is that the system employed may be calibrated for testing a large variety of Test Parts 10 using different test pressure at a minimum time by employing only one flow rate on the Flow Meter FM, and one setting on the Test Timer T-3 for all settings of the Variable Attenuation Control VAC of the High Impedance Input Amplifier HIIA, the latter providing greater or lesser amplification of leak signals generated by the Differential Pressure Gage Transducer DPGT for Test Parts 10 having larger or smaller test cavities.

Although but a single embodiment of an electro-pneumatic porosity test method and means of the invention has been disclosed and described herein, it is obvious that many changes and modifications of the method steps and elements of the invention may be made without departing from the spirit and scope of the invention.

I claim:

1. An electro-pneumatic porosity test means for leak testing cavitied parts having a cavity thereof hermetically sealed for test purposes comprising:
   a source of compressed air,
   an electro-pneumatic system including timer controlled solenoid valve means connecting said compressed air source to said test part cavity filling said test part cavity at a pressure somewhat higher than a selected test pressure,
   a differential pressure gage transducer in said electro-pneumatic system of the type including extremely flexible diaphragm with substantial air pressure cavities on opposite sides thereof,
   said means filling said test part cavity with air pressure somewhat higher than said selected test pressure being connected to and filling said cavities on opposite sides of the diaphragm of said differential pressure gage transducer,
   timer controlled stabilization cycle means including a precision pressure regulator stabilizing the air pressure in said test part cavity and in said cavities on opposite sides of said differential pressure gage transducer diaphragm at said selected test pressure,
   timer controlled means initiating a test cycle for a timed duration responsive to the completion of said stabilization cycle whereby said differential pressure gage transducer indicates any air leak in said test part on the gage thereof during said test cycle responsive to movement of the diaphragm thereof,
   said differential pressure gage transducer providing an electrical impulse proportionate to any leakage of air through said test part,
   electronic means including amplifying means and a differential voltage leak indicator calibrated in selected units of volume connected to said differential pressure gage transducer operable during said test cycle responsive to said electrical impulse provided by said differential pressure gage transducer indicating visually on said differential voltage leak indicator the amount of leakage of air from the test part cavity, and
   zero drift compensating means connected between said differential pressure gage transducer and said amplifying means establishing a zero-null condition in said electronic means just prior to the initiation of each said test cycle.

2. An electro-pneumatic porosity test means as claimed in claim 1 wherein:
   a manually operated valve controlled flow meter operable only for calibration purposes is provided in the pneumatic system between a non-leaking test part and said differential pressure gage transducer usable to establish the equivalent of a selected known amount of leakage from said non-leaking test part, and
   said electronic means includes a calibrated variable sensitive control having its calibrations adjustable to correspond to said known amount of leakage of air from the test part cavity thereby producing useful electrical impulses.

3. An electro-pneumatic porosity test means as claimed in claim 1 wherein:
   said electronic means includes a variable attenuation control for calibration of said electronic means whereby to provide accurate indication and signaling of the amount of leakage of air from the test part cavity.

4. An electro-pneumatic method of testing the porosity of cavitied parts wherein the cavity of the test part is hermetically sealed and having a pneumatic pressure line leading to said cavity and to a differential pressure gage transducing means comprising the steps of:

establishing a time controlled fill cycle including the filling said test part and said transducing means with compressed air at an air pressure somewhat above a selected test pressure, then establishing a time controlled stabilization cycle operable responsive to the completion of the fill cycle including stabilizing the air in said test part at said selected test pressure and in said transducing means at a substantially zero differential pressure condition in said transducing means, then establishing a time controlled test cycle wherein any leak in said test part creates a first electrical signal of an intensity proportionate to the volume of leakage of air from the test part cavity during the test cycle, creating electronically responsive to the intensity of said first electrical signal a second amplified electrical signal employable to indicate accurately in units of volume or pressure loss the extent of leakage from said test part cavity and the acceptance or rejection of said test part, and establishing a zero-null condition prior to the initiation of said test cycle whereby to assure accuracy of testing of the test part.

5. An electro-pneumatic method of testing the porosity of cavitied parts as claimed in claim 4 wherein:

a single reference standard of flow of air from the test part cavity is employed to establish accurate indication of the extend of leakage from test part cavities at different volumes and under different test pressures, and the permissable leak rate in the part to be tested being selectable prior to testing within a wide range of leak rate increments.

6. An electro-pneumatic method of testing the porosity of cavitied parts as claimed in claim 4 wherein:

a single reference standard of flow of air from the test part cavity is employed to calibrate the indication of the extent of leakage from test part cavities at different test part volumes and under different test pressures, and the permissable leak rate selection being operable independent of said single reference standard.

References Cited

UNITED STATES PATENTS

| | | | |
|---|---|---|---|
| 2,936,611 | 5/1960 | Le Mat et al. | 73—40 XR |
| 3,314,283 | 4/1967 | Fitzpatrick et al. | 73—40 |
| 3,326,034 | 6/1967 | Fitzpatrick et al. | 73—40 |
| 3,331,237 | 7/1967 | Strang | 73—40 |
| 3,359,785 | 12/1967 | Fournier | 73—40 |

LOUIS R. PRINCE, Primary Examiner

J. NOLTON, Assistant Examiner